US006080528A

United States Patent [19]
Ho et al.

[11] Patent Number: 6,080,528
[45] Date of Patent: Jun. 27, 2000

[54] CAMOUFLAGE OF IMAGED POST SPACERS AND COMPENSATION OF PIXELS THAT DEPART FROM NOMINAL OPERATING CONDITIONS BY LUMINANCE DIFFUSION BY MECHANICAL MEANS

[75] Inventors: Kenneth C. Ho, Yonkers; Alan Edward Rosenbluth, Yorktown Heights, both of N.Y.

[73] Assignee: International Business Machines Corporation, Armonk, N.Y.

[21] Appl. No.: 09/127,506

[22] Filed: Jul. 31, 1998

[51] Int. Cl.[7] .................................................. G02F 1/1335

[52] U.S. Cl. .......................... 430/313; 430/321; 349/192

[58] Field of Search ..................................... 430/321, 313; 349/192; 438/4

[56] References Cited

U.S. PATENT DOCUMENTS

| | | | |
|---|---|---|---|
| 5,267,066 | 11/1993 | Nakai et al. | 349/192 |
| 5,546,206 | 8/1996 | Nakanishi et al. | 359/67 |
| 5,638,199 | 6/1997 | Tsubota et al. | 349/110 |
| 5,835,179 | 11/1998 | Yamanaka | 349/161 |

FOREIGN PATENT DOCUMENTS

| | | |
|---|---|---|
| 4-178622 | 6/1992 | Japan . |
| 8-122727 | 5/1996 | Japan . |

*Primary Examiner*—John A. McPherson
*Attorney, Agent, or Firm*—Scully, Scott, Murphy & Presser; Daniel P. Morris, Esq

[57] ABSTRACT

The present invention describes a method and an apparatus for eliminating image artifacts due to imaging of post spacers, or other small clusters of pixels that deviate from nominal performance of light valve technology. This invention is applicable to imaging technologies whose pixels are separately addressable.

5 Claims, 9 Drawing Sheets

DISPLAY PIXEL AND POST SPACER LAYOUT

CAMOUFLAGE OF IMAGED POST SPACERS AND COMPENSATION OF PIXELS THAT DEPART FROM NOMINAL OPERATING CONDITIONS BY LUMINANCE DIFFUSION BY MECHANICAL MEANS

BACKGROUND OF THE INVENTION

1. Field of the Invention

The present invention is directed to imaging devices whose pixels are separately addressable, and more particularly to the elimination of artifacts in light valves and liquid crystal displays caused by post spacers and other departures from nominal operation.

2. Description of Prior Art

A typical light valve comprises a thin layer of liquid crystals interposed between two glass plates coated with thin layers of transparent conductors such as indium tin oxide and polymer alignment films. Light valves and liquid crystal displays generate images by modulating the amount of transmission, reflection and scattering of an incoming light source.

In a typical liquid crystal display polarizers are on the top glass plate as well as on the bottom glass plate. On reflective light valves, the bottom glass plate is replaced by a reflective mirror. The pixels are individually addressed by a matrix of conducting electrodes and typically driven by transistors fabricated on a silicon or amorphous silicon substrate.

The liquid crystals' orientation above each pixel can be changed, based on its optical anisotropy, by driving the transistor at different voltages. By changing the liquid crystals' orientation, incoming polarized light from one polarizer can be rotated, thereby determining the amount of light transmitted through the other polarizer. The amount of reflected or scattered light in a reflective light valve or a liquid crystal display is determined by the rotation of the polarized light and the reflection of the mirror layer.

During the assembly of light valves and liquid crystal displays it is critically important to maintain uniformity in the gap distance occupied by the liquid crystals. It is also critically important to prevent contamination of the liquid crystal layer. In the practical manufacturing of light valves and liquid crystal displays, the cost can be significantly reduced if the fabrication tolerances permit a small number of defective pixels whose operation is perceptibly different from nominal operating conditions. There are many reasons for these defects, such as shorts and opens in the conductor electrodes, transistors that operate away from nominal operating conditions, non-uniform charge retention, contamination during processing, defective mask steps during photolithography and non-uniform cell gap control.

In liquid crystal displays or projection systems it is essential to achieve a good cell gap control, even as simultaneously attempts are made to reduce voltage to the minimum level consistent with the driver technology employed. To obtain optimal response with many liquid crystal modes, such as twisted nematic for example, accurate control of cell gap is essential in order that uniform grey scale, fast switching speeds, and high contrast be maintained over the cell.

In modern display technologies, the liquid crystals operate in modes that require strict tolerance and uniformity in the cell gap over the full area of the display. One solution for maintaining a good cell gap between the glass layers is to use interposing post spacers in the pixel array region. Post spacers are sometimes referred to just as spacers or posts.

Fortunately, when light valves based on silicon technology are used, it becomes fairly straight forward to place these spacers in the boundaries between the pixel mirrors within the cell. These boundaries are dark, so the spacers are not easily seen directly. However, the post still perturbs the liquid crystal alignment above the mirrors of the surrounding pixels, causing changes in the polarization efficiency of the liquid crystals in the region around the posts. Changes in the polarization efficiency change the luminance and the chrominance in the vicinity of post spacers when the light valve is imaged on the screen. Even with a minimum resolution post element, delineated by modern fine-line lithography, the posts will still show artifacts when imaged.

Shadowing from the rubbing of liquid crystals will make the imaged artifacts still more visible. The shape of the post can be physically modified to reduce post artifacts, but this increases the fabrication difficulty and does not provide a solution for artifact elimination over the full luminance range generated by the display.

These defects detract from the appearance of images and therefore limit the commercial usefulness of a display. What is needed is a way to deploy posts without creating imaged artifacts. This method must be robust in dealing with variability in cell process and changing illumination conditions.

SUMMARY OF THE INVENTION

The object of the present invention is to provide a method for eliminating image artifacts due to imaging of post spacers, or other small clusters of pixels that deviate from nominal performance of light valve technology. The present invention is equally applicable for correction of sub-pixel defects and column disclinations and can be applied to any display technology that has matrix addressed pixels.

The image artifacts, due to post spacers perturbing the liquid crystal alignment in a light valve, will usually either reduce or increase the perceived luminance in the neighborhood of a post spacer as compared with a similar region without a post spacer.

Due to the imperfection in the light valve fabrication or pixels whose performance diverges from the norm the image artifacts can be corrected or greatly compensated to improve image uniformity and quality.

The above-mentioned image artifacts can be effectively camouflaged by utilizing the properties of the human visual system (HVS). In the embodiment of the present invention where the associated luminance correction is small, the spatial resolution of the HVS is reduced to a level coarser than the width of one pixel, and the corrected intensity in artifact neighborhood pixels is visually associated with the pixel whose intensity departs from nominal operating conditions. The correction is in effect diffused throughout the image region containing the post or other artifact. This post camouflage operation can operate continuously, making it applicable for both static images and video.

DETAILED DESCRIPTION OF THE INVENTION

The present invention provides a method for eliminating or reducing visually perceptible artifacts in images produced by a pixel or a small cluster of pixels, when these pixels operate outside nominal operating conditions. The imaging of post spacers is an example of image artifacts that are effectively eliminated by applying the present invention. Nominal operating conditions for imaging of post spacers are the luminance values around four pixels where posts are not present.

Figure 1:
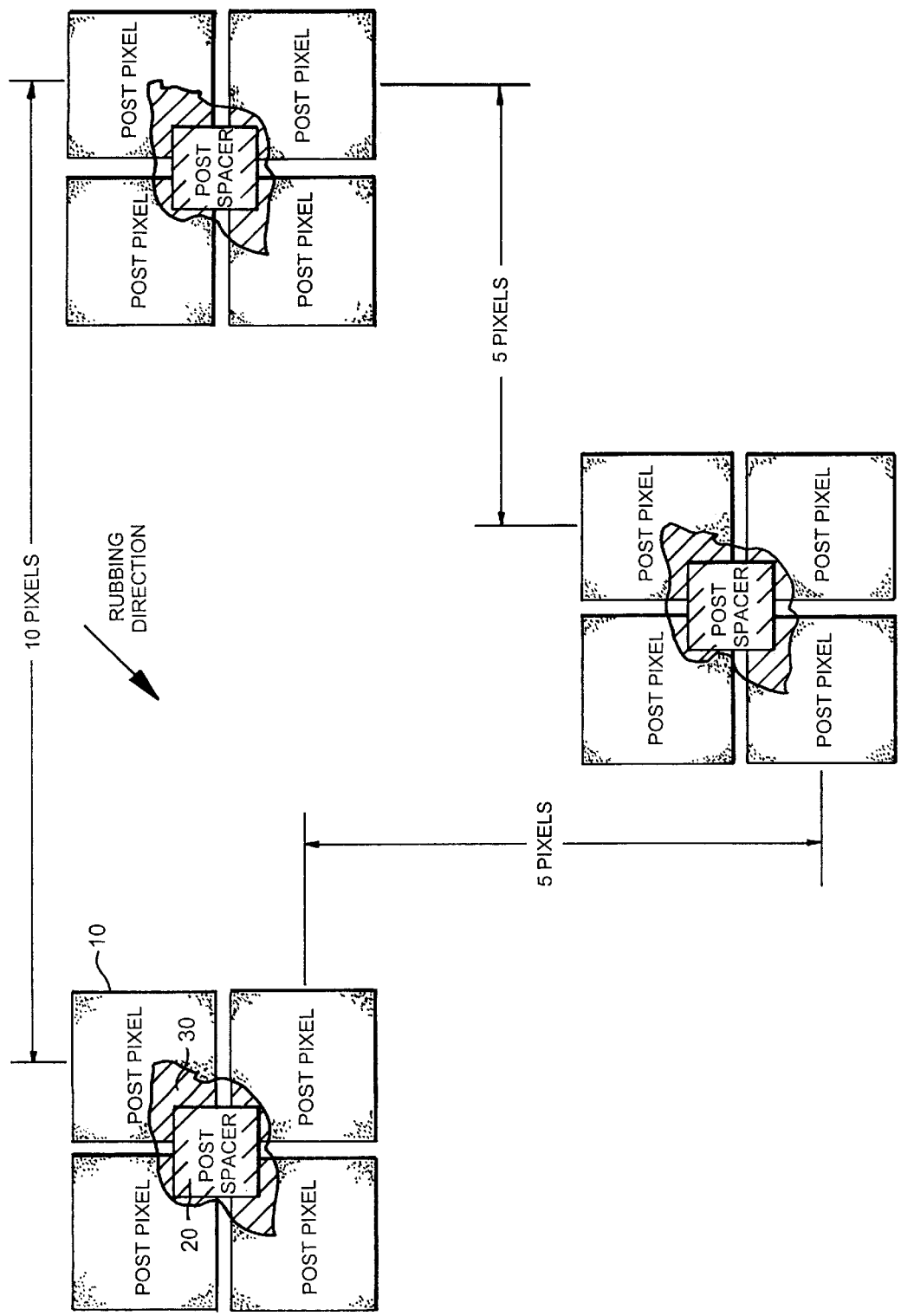
FIG. 1 shows a typical display pixel and post spacer layout.

FIG. 1 shows a typical post layout. The liquid crystals are perturbed in the four pixels 10 surrounding the post 20 (post pixels). Post pixels 10 may include other pixels beyond the four already described. The post 20 layout and the pixel structure will determine which post pixel 10 voltages are modified for the post camouflage 30.

The preferred embodiment of the post camouflage technique is a static, mechanical adjustment of pixel intensity, which is inexpensive to implement. For example by printing small optical artifacts on the glass layer of the light valve above non-post pixels in such a way that for some worst case gray level the resulting intensity of the non-post pixels is thereby made to match that of post pixels.

Figure 2:
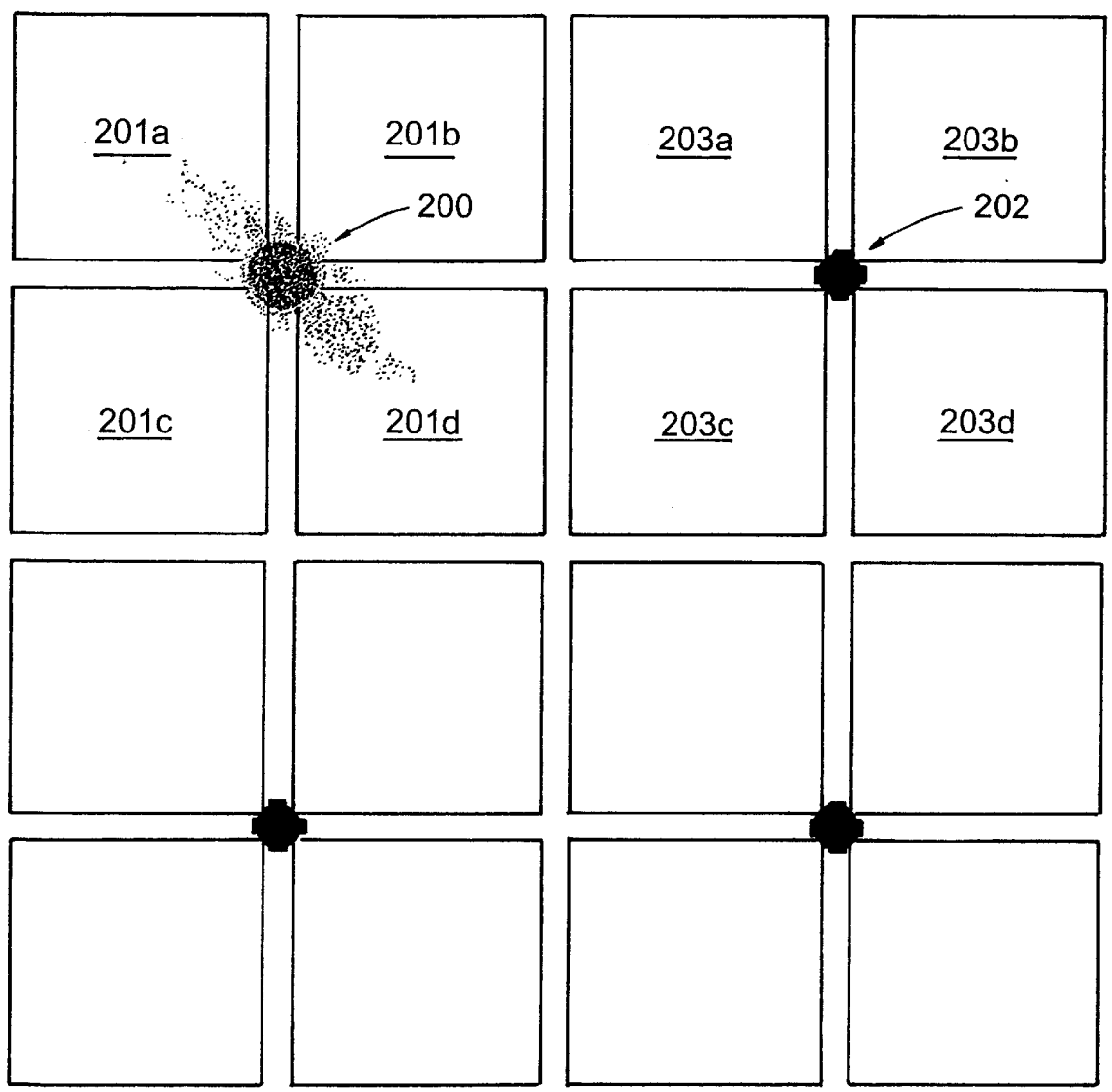
FIG. 2 shows the magnified view of a typical display pixels and post spacers.

FIG. 2 shows a magnified view of a post 200 and associated liquid crystal's disturbance. Image artifact 200 has a size only slightly smaller than one pixel and is clearly visible. However, because it causes only a weak modulation in intensity, it would not be visible as a distinct entity when the full display is viewed without magnification. Instead, the user would perceive the image intensity to depart from the nominal in the vicinity of pixels 201a, 201b, 201c and 201d. In most cases, the preferred method for correcting this image nonuniformity according to this invention is to adjust the driving voltage on pixels 201a–d to restore the local image intensity to nominal operating conditions, as described above. In some cases it may be less expensive to instead deploy fixed camouflaging artifacts such as 202 in such a way that the integrated intensity in pixels 203a–203d matches that of pixels 201a–201d. Because of the small size of camouflage artifact 202 and the weak intensity modulation of image artifact 200, the user will perceive the image as uniform. However, the intensity of pixels 203a–203d can only be made to match that of pixels 201a–201d at a single gray level, for example at the gray level where artifacts 200 are most objectionable, at other gray levels the matching will be imperfect and artifact visibility will be reduced but not eliminated.

A wider range of correction can be obtained with mechanical camouflage by deploying additional correcting artifacts above the image artifacts 200. This is done in such a way that a significant portion of artifact 200 is blocked. Larger artifacts must then be deployed at non-post pixels. In the limit that the blocking artifacts fully cover image artifacts 200, one would use camouflage artifacts of the same size in all parts of the image. The image intensity, in this case, would be severely reduced because of the large size of artifacts like 200.

To implement mechanical adjustments of pixel intensity, fixed camouflaging artifacts, such as 202 (FIG. 2) can be deployed. The camouflaging artifacts will be circular dots delineated on the top glass to match a pattern shown in FIG. 2, they will typically, but not necessarily be the size of spacer posts. The camouflaging artifacts will typically be made of chrome or copper whose thickness is determined by matching the integrated intensity of 203a–d with 201a–d.

Figure 3:
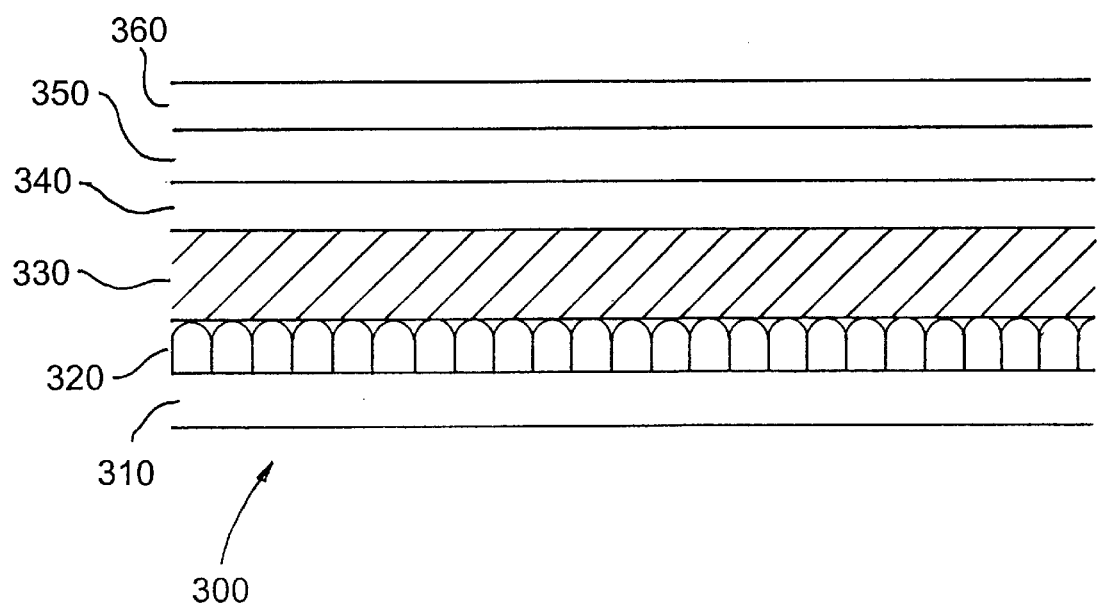
FIGS. 3–5 are crossectional diagrams showing the step by step patterning of the mechanical camouflaging artifacts of the present invention.

The patterning of camouflaging artifacts is produced by a classical photolithography process. As shown in FIG. 3, the liquid crystal or light valve display 300 is manufactured by forming a layer of liquid crystals or light valves 320 on a silicon substrate 310. A layer of top glass 330 is formed over the layer of liquid crystals or light valves 320.

The top glass 330 may have Indium Tin Oxide (ITO) and Polyimide layers, representative of liquid crystal or light valve display technology. For adhesion or compatibility with the materials above, other layers 340 may be deposited on the top glass 330. To create the patterned artifacts, a layer of chrome or copper 350 is sputtered or grown on the top layer 340. Then a positive photoresist layer 360 is spun on top of the chrome or copper layer 350.

Figure 4:
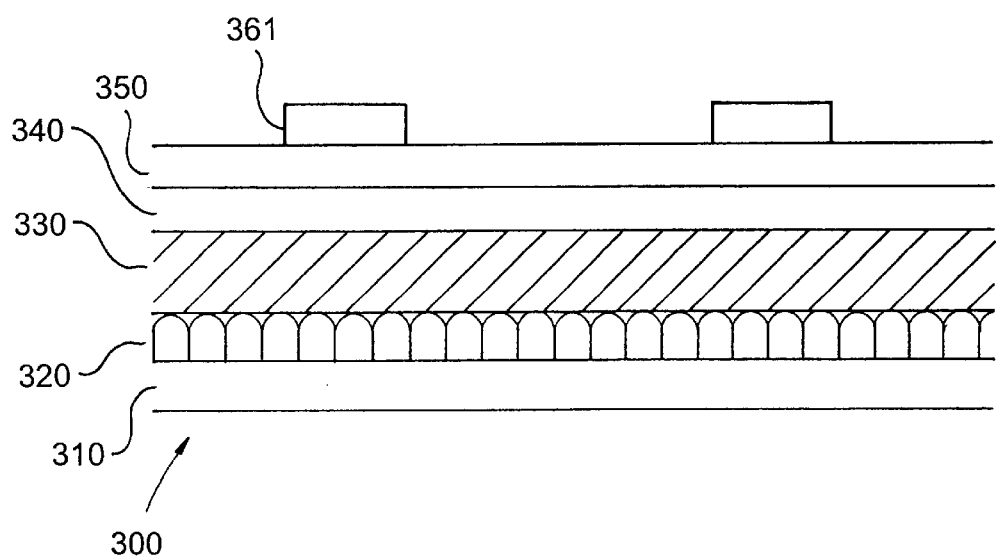
Figure 5:
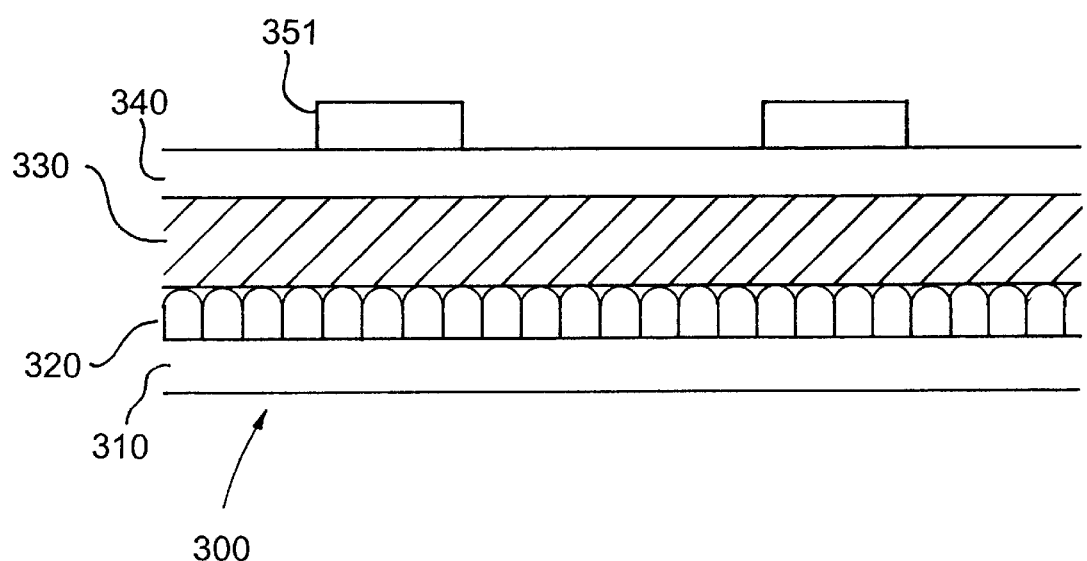

As shown in FIG. 4, a photoresist dot pattern is created by exposing the resist through a mask comprised of an aperture that agrees with the artifact pattern of FIG. 2 (no camouflaging artifacts on top of spacer posts). The exposed photoresist 360 (FIG. 3) is washed away leaving a layer composed of a positive photoresist dot pattern 361, that agrees with the artifact pattern of display pixels and post spacers of FIG. 2, on top of the chrome or copper layer 350. The layer of chrome or copper 350 and the exposed layer of photoresist 361 is etched away until only the chrome or copper under the unexposed photoresist 351 (FIG. 5) remains.

A number of embodiments of the fabrication of camouflaging artifacts of this invention are further disclosed only by way of example and not to limit the invention.

Figure 6A:
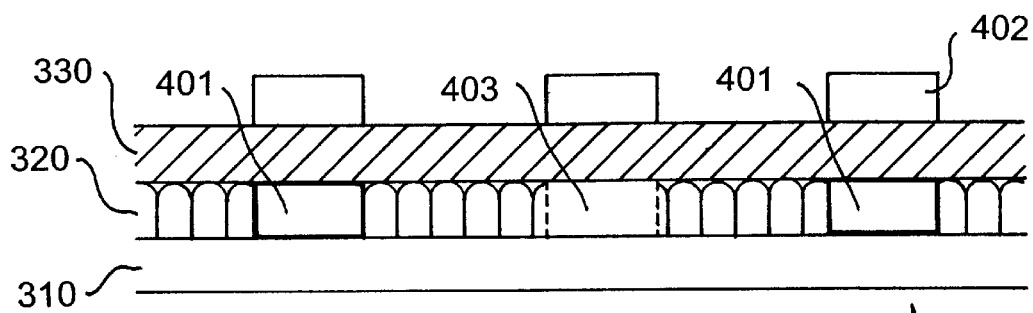
FIGS. 6(A)–6(C) are a crossectional diagram showing placements of camouflaging artifacts of three mechanical embodiments of the present invention.
Figure 6B:
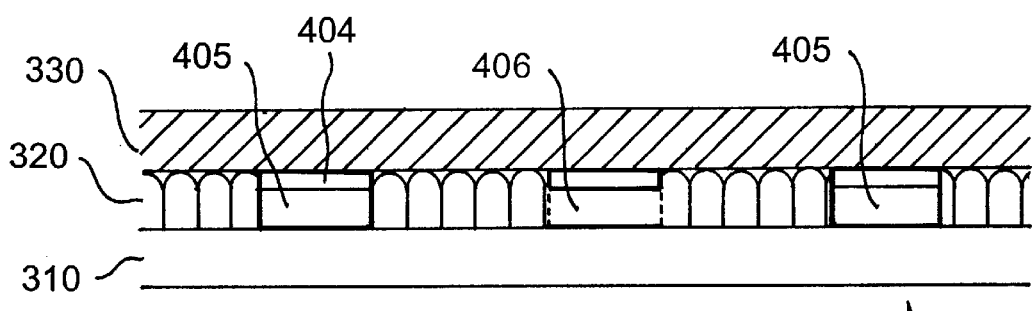
Figure 7A:
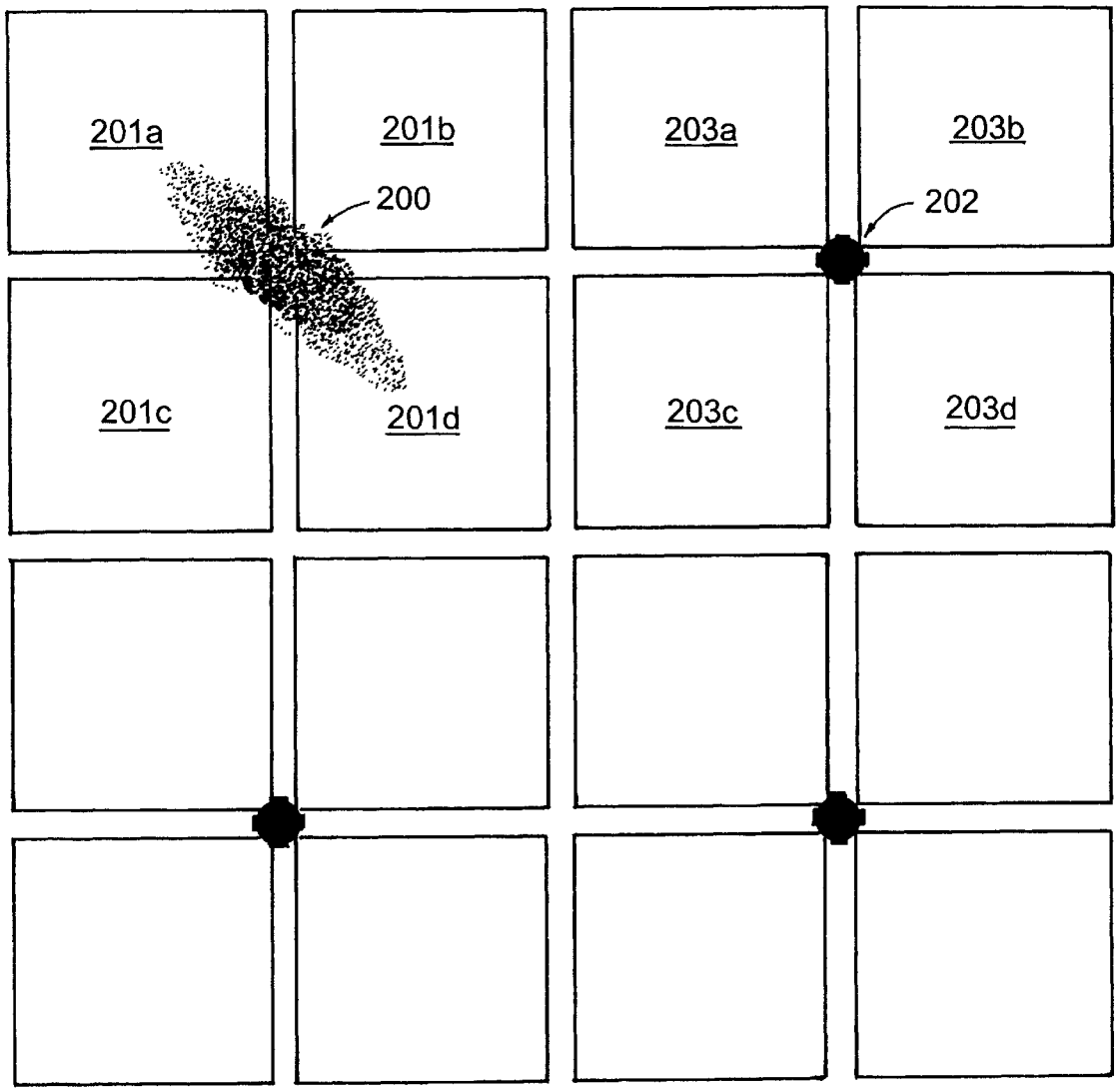
FIGS. 7(A)–7(C) are the magnified view of a typical display pixels and post spacers, showing placements of camouflaging artifacts of three mechanical embodiments of the present invention.
Figure 7B:
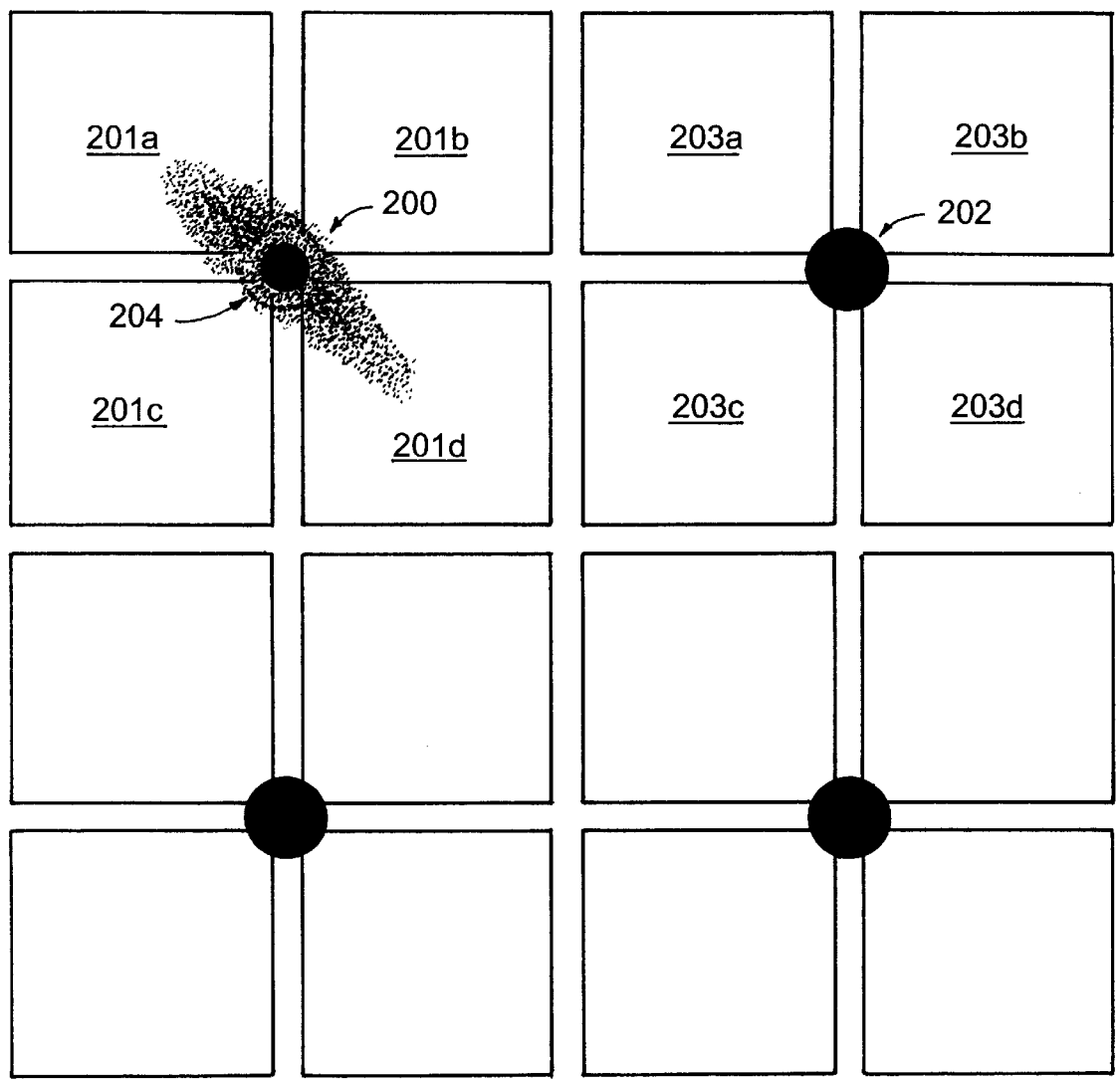

FIG. 6(A) shows posts 401 fabricated on silicon substrate 310. The chrome or copper camouflaging artifact 402 can be deployed on the top glass 330, either on post pixels 401 or non-post pixels 403. The result of this post pixels 401 camouflaging or non-post pixels 403 camouflaging is shown in FIG. 7(A), where camouflaging artifacts 202 correct the image non-uniformity by matching the integrating intensity of post pixels 201a–201d to that of non-post pixels 203a–203d over a small range of gray values.

Where the posts 405 are fabricated on the top glass itself, as shown in FIG. 6(B), the camouflaging artifacts 404 can be fabricated between the top glass 330 and posts 405 or non-posts 406. The preferred placement of posts in this case is the inter-pixel gaps as shown in FIG. 2. If the random placement of posts is deployed on the top glass, the posts may further detract from the appearance of the images by contacting within pixels after the assembly process. The result of this camouflaging, between the top glass 330 and posts 405 or non-posts 406, is shown in FIG. 7(B), where camouflaging artifacts 202, 204 correct image non-uniformity by matching integrating intensity of post pixels 201a–201d to that of non-post pixels 203a–203d over a range of gray values.

Figure 6C:
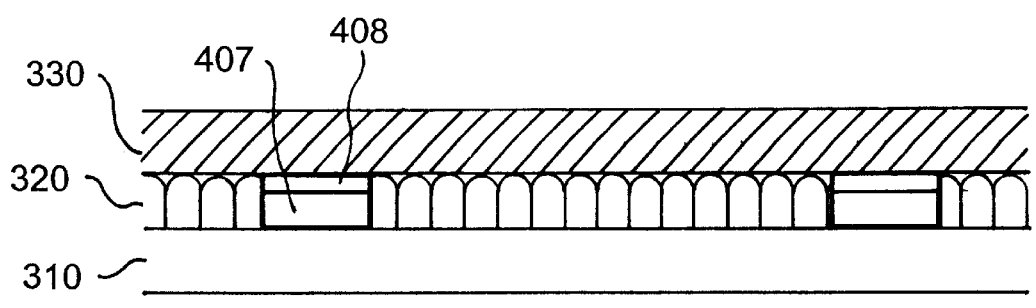
Figure 7C:
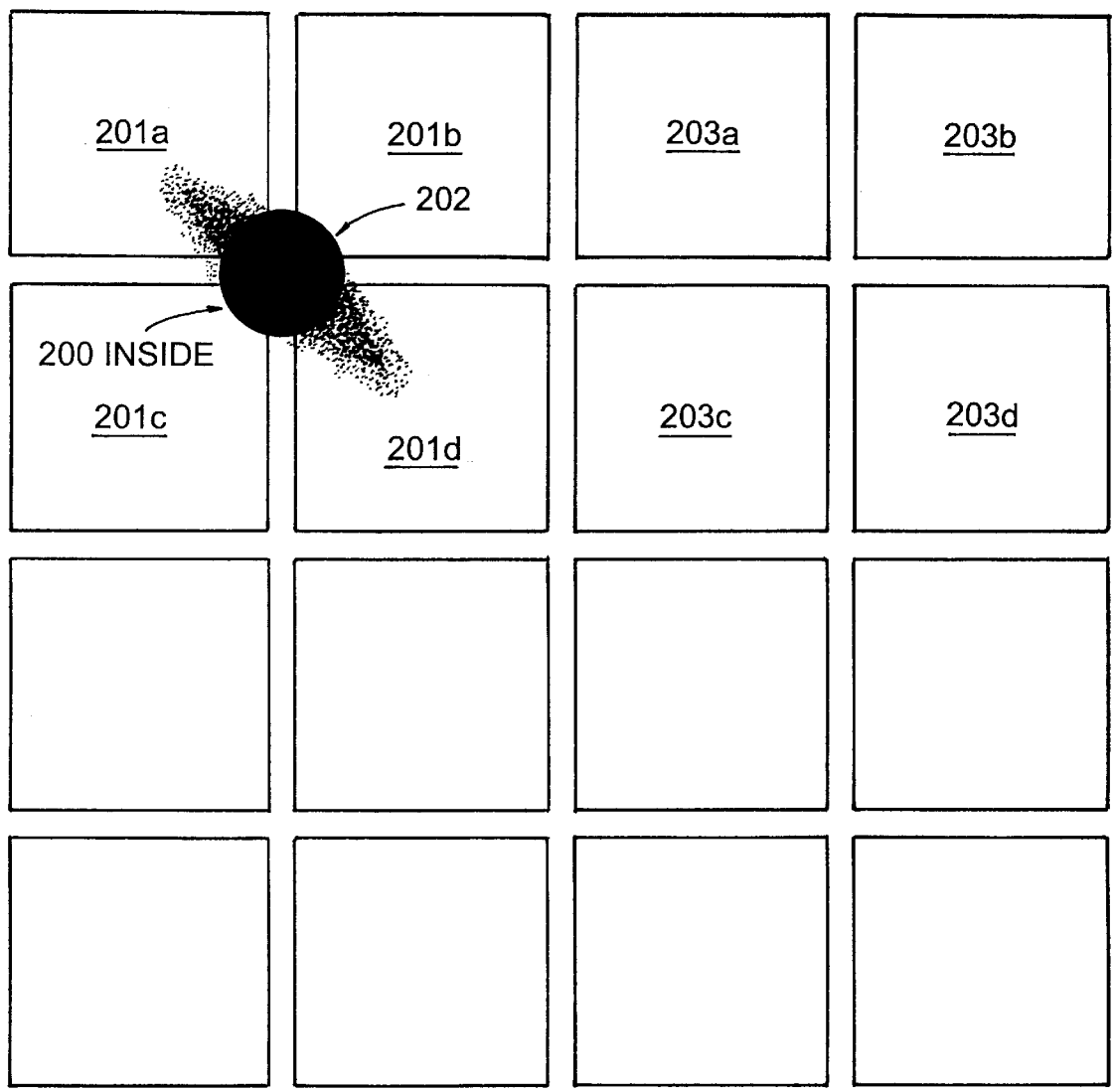

In another embodiment, shown in FIG. 6(C), only posts 407 are covered with opaque material 408 forming the camouflaging artifact. The result of this camouflaging is shown in FIG. 7(C), where the camouflaging artifact 202 fully covers the image artifact 200. The post pixel intensity is severely impacted because the camouflaging artifact 202 has to be relatively large as compared to the previous two embodiments shown in 7(A), 7(B).

The mechanical camouflage of display pixels and post spacers shown in FIG. 2 and described above, can be implemented in a number of ways, a) by placing camouflaging artifacts on non post pixels;

b) by placing camouflaging artifacts on post pixels, such as 200 and a smaller camouflaging artifacts on non-post pixels, such as 202, to allow a greater range of correcting post pixels to nominal in the gray scale, albeit with some loss in brightness; and c) by deploying camouflaging artifacts on post pixels such as 200.

The mechanical camouflage of (b) and (c) implementations have an added advantage of correcting post pixels in the off state, with only a slight loss in the brighter states.

Techniques of the present invention are not limited to the correction of image artifacts resulting from spacer posts. These techniques can be applied whenever the departure of a subset of pixels from the nominal operation is sufficiently small that when a correcting intensity is imparted to pixels in the neighborhood of the non nominal image region, the HVS cannot perceive the fine-scale variation of intensity within this neighborhood and can only perceive that the integrated intensity within the neighborhood has been restored to the nominal operating conditions.

This invention is not limited to the correction of static image artifacts. Because the correction is made continuously, it can be applied to any predictable non uniformity that effects small regions of the image so long as the average intensity within each resolvable element of these image regions departs slightly from nominal operating conditions.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for improving the perceived uniformity of image intensities that deviate from nominal operating conditions, the method comprising:

forming a layer of camouflaging material over pixels that do not depart from nominal operating conditions;

forming a layer of positive photoresist over said layer of camouflaging material;

forming a mask, comprising an aperture that agrees with the pattern of artifacts, over said layer of positive photoresist; and exposing said photoresist and washing away the exposed photoresist; and etching away the layer of camouflaging material until only the material under the unexposed photoresist pattern remains, thereby forming camouflaging artifacts on pixels that do not depart from nominal operating conditions to match said pixels' intensity to those of pixels that do depart from nominal operating conditions.

2. The method of claim 1, comprising the steps of forming a layer of liquid crystals or light valves on a silicon substrate;

forming a layer of glass over said layer of liquid crystals or light valves;

forming a layer of adhesion material on said layer of glass; and forming a layer of camouflaging artifacts on said layer of adhesion material.

3. The method of claim 1, whereby camouflaging artifacts are placed on non post pixels.

4. The method of claim 1, whereby camouflaging artifacts are placed on post pixels and a larger camouflaging artifacts on non-post pixels to allow a greater range of correcting post pixels to nominal in the gray scale.

5. The method of claim 1, whereby the camouflaging artifacts are deployed on post pixels.

* * * * *